April 24, 1934.   H. HUEBER ET AL   1,956,516
WIPER ARM MOUNTING
Filed April 1, 1930
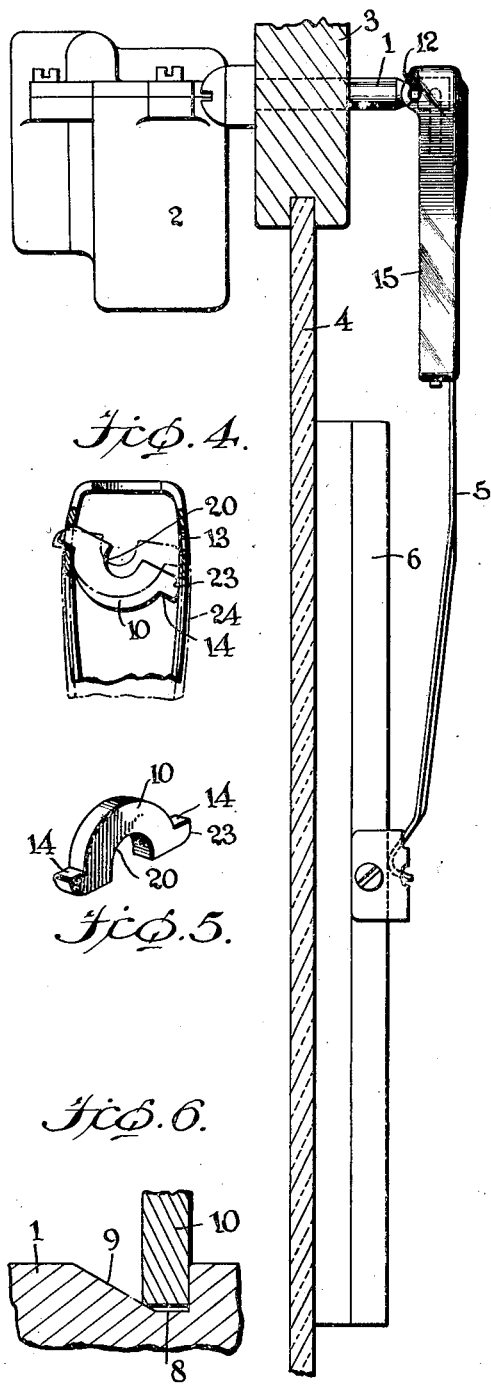
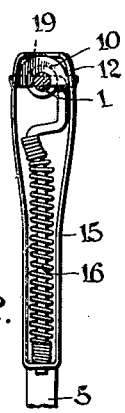
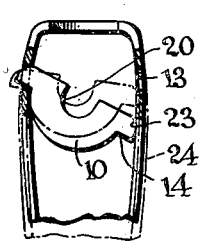
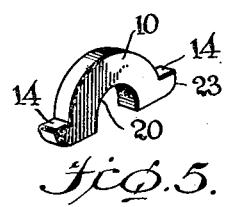
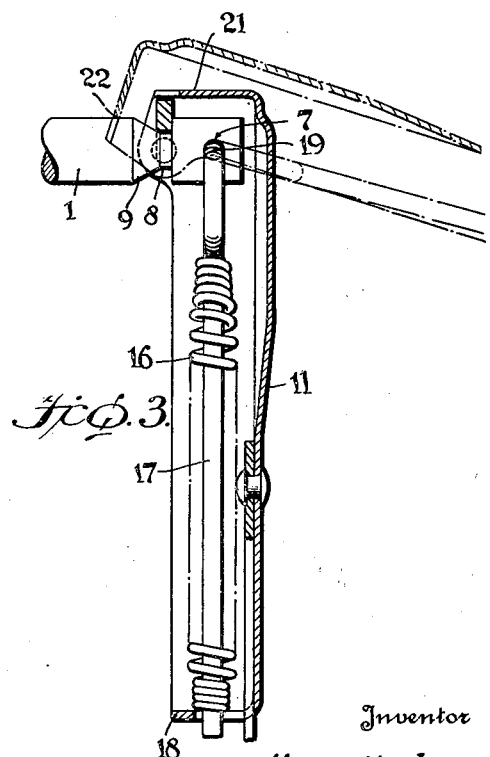
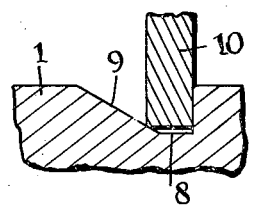
Inventor
Henry Hueber
Erwin C. Horton
By Barton A. Bean Jr.
Attorney Patented Apr. 24, 1934

1,956,516

UNITED STATES PATENT OFFICE 1,956,516

WIPER ARM MOUNTING

Henry Hueber, Buffalo, and Erwin C. Horton, Hamburg, N. Y., assignors to Trico Products Corporation, Buffalo, N. Y.

Application April 1, 1930, Serial No. 440,819

13 Claims. (Cl. 15—255)

This invention relates to the mounting or attachment of the wiper carrying arm of a windshield cleaner to its operating shaft, and more particularly to improvements on the mounting forming the subject matter of Patent No. 1,920,145.

In the embodiment depicted by the drawing in said patent the wiper carrying arm is provided with a stirrup suspended from the shaft for swinging in a plane perpendicular to the windshield glass.

The present invention has for its object to provide an improved mounting with greater flexibility and range of movement; and also to provide one in which the arm may be swung to a position substantially coaxial with its shaft.

The invention further resides in the provision of a wiper arm mounting wherein the attachment of the arm to the shaft is greatly facilitated; and one in which there is provided a saddle-like suspension of the arm from the shaft wherein the pivotal point of the arm is lowered with respect to the shaft so as to maintain the assembly of parts intact within normal limits of movement.

Further the invention resides in the manner of mounting the saddle in the stirrup, and also in the salient features of construction hereinafter set forth in the description and claims, reference being made to the accompanying drawing wherein:

Fig. 1 is a fragmentary sectional view through the windshield depicting a windshield cleaner mounted thereon which embodies the present invention.

Fig. 2 is a fragmentary inside elevation of the shaft mounted end of the arm, the shaft being shown therein in cross section.

Fig. 3 is a fragmentary vertical section therethrough in a plane perpendicular to the windshield glass and indicating by broken lines the movement of the arm in such plane.

Fig. 4 is a detailed view illustrating the manner of inserting the saddle within the stirrup.

Fig. 5 is a perspective view of the saddle per se.

Fig. 6 is a fragmentary detailed sectional view more clearly depicting the disposition of the saddle in its shaft seat.

In Fig. 1 a shaft 1 of a windshield cleaner motor 2 is projected through the header bar 3 of the windshield 4 to support the arm 5 which in turn carries in its lower end a wiper blade 6. The shaft is provided adjacent its forward end with a transverse hole or bearing 7, and rearwardly or inwardly thereof with a seat 8 such as might be formed by providing an annular groove in the shaft. The rear wall 9 of the groove is inclined rearwardly to guide the saddle 10 to the bottom of the groove and against the front wall thereof to the avoidance of idle play in the groove.

The wiper arm is provided at its upper end with a stirrup 11 which has a pair of opposed ears 12 apertured to form bearings 13 in which oppositely disposed trunnions 14 of the saddle 10 are designed to journal. These ears may extend downwardly to form side walls 15 for enclosing the spring 16 and its mounting rod 17, the latter having sliding engagement at its lower end through the bottom wall 18 of the stirrup section and being angularly deflected at its upper end to form a pintle 19 for pivoting in the transverse opening or bearing 7. The spring exerts pressure on the arm to cause it to swing toward the windshield glass for urging the wiper into good contact therewith, and, further, to hold the saddle yieldably engaged with its seat. The saddle 10 is provided with a cut-out 20 to receive the shaft, giving to the saddle an arch-like appearance with the trunnions 14 extending from the base of the arch. This brings the disposition of the trunnions with respect to the pintle 19 substantially in the plane thereof and therefore when the arm is swung outwardly from the glass the arm may be swung substantially to a position coaxial with the shaft, when otherwise unrestricted. In the present showing the stirrup is provided with a top wall 21 to provide a finish to the assembly, which when the arm is swung outwardly to an extreme angle will come in contact with the shaft as indicated at 22. Displacement of the saddle is effected by further swinging beyond the dotted line position in Fig. 3 whereby the wall 21 will fulcrum on the shaft and lift the saddle from its seat to bring the trunnions 14 above the plane which includes both the point of fulcrum and the pintle, whereupon the assembly will be easily displaced.

In mounting the saddle within the stirrup, one trunnion is engaged in a bearing 13 and the opposite trunnion sprung between the ears 12 until the companion trunnion enters its bearing 13. To facilitate this mounting the under surface of the trunnion is rounded as indicated at 23 for riding on and camming against the inner surface of its ears 12, as indicated in Fig. 4 causing the latter and the adjacent wall 15 to spring outwardly as indicated at 24 in said view. The saddle is thus free to swing about the axis of its trunnions, and when mounting the wiper arm the saddle is straddled over the shaft at the reduced diameter thereof, as provided by the groove 8, and after first journalling the pintle 19 in its bearing 7.

This improved mounting lowers the points 14 of suspension of the stirrup on the shaft as well as with respect to the pintle 19 so that the relationship between trunnions 14 and pintle 19 can not be varied to such an extent as to cause displacement of the assembly without obstruction to such movement by the wall 21 contacting with the operating shaft. The width of the groove at its bottom is such as to cause the stirrup 10 to seat at its rear side on the inclined wall 9 whereby the stirrup is held against idle or loose play within the groove. This insures a steady mounting of the saddle and a definite location of the trunnions.

It will be understood that the present invention provides an improved wiper mounting means, including a stirrup member and a rod member pivoted to an actuating shaft, a pivoted saddle serving to connect the stirrup to the shaft, and one of the members being extended for supporting a wiper blade. It will be further understood that the embodiment, herein described and illustrated, is merely illustrative of the principles of the invention which may be applied to wiper mountings having different arrangements of parts all within the purview of this invention.

What is claimed is:

1. A wiper arm assembly comprising a wiper carrying arm having a stirrup with opposed ears formed with journal bearings, a saddle having oppositely disposed trunnions journalled in the bearings of the stirrup for mounting on a wiper shaft, and spring means for holding the saddle seated on the shaft.

2. A wiper arm assembly comprising a wiper carrying arm having a stirrup with opposed resilient bearing portions, a saddle having oppositely disposed trunnions journalled in the bearing portions of the stirrup, said saddle supporting the stirrup on one side of the trunnions, the opposite side and corner of one trunnion being rounded to facilitate springing the bearing portions apart during the introduction of the saddle therebetween.

3. In combination with a wiper shaft, a stirrup, a saddle having straddling engagement with the shaft and pivotally connected to the stirrup at points on opposite sides of the shaft, and resilient means carried by the stirrup for exerting pressure on the shaft to hold it engaged with the saddle.

4. In combination with a wiper shaft, a wiper and an arm carrying the wiper and supported from the shaft, a saddle having straddling engagement with the shaft and pivotally connected to the arm at points on opposite sides of the shaft substantially diametral thereof, said shaft having a bearing, and resilient means engaging in the bearing, said resilient means being carried by the arm and exerting pressure on the bearing and arm to hold the saddle engaged with the shaft.

5. In combination with a wiper shaft, a saddle hung thereover and having oppositely disposed pivot parts, a wiper carrying arm having spaced parts at one end cooperating with the pivot parts for pivotally mounting the arm relative to the shaft, and resilient means connected to the arm and acting upon the shaft and arm to hold the saddle engaged with the shaft, said saddle and the point of connection of the resilient means to the shaft being spaced along the shaft, whereby the resilient means will also function to urge the opposite end of the arm toward the windshield.

6. A mounting for wiper arms of windshield cleaners, comprising a wiper shaft having a transverse opening and a seat disposed inwardly along the shaft from the opening, a wiper moving arm having a portion extending into the opening for swinging relative to said shaft in a plane perpendicular to the windshield glass, a spring carried by the arm, a stirrup housing the spring and compressing the same toward said portion, and a saddle engaged in said seat and having oppositely extending trunnions journalled in the stirrup whereby the latter may pivot in a plane perpendicular to the windshield glass.

7. A wiper arm assembly having a hollow stirrup opening toward a wiper shaft and embracing the end of the shaft, the stirrup having opposed bearings in the side walls thereof, a saddle having trunnions engaged in said bearings, and a spring device engaging the shaft and the stirrup for holding the saddle engaged with the shaft.

8. In a windshield cleaner, a wiper shaft having a seat, a wiper arm, a seat engaging member for engaging the seat, said seat engaging member being pivoted to the wiper arm, and resilient means acting between the arm and the shaft for holding the seat engaging member against said seat.

9. In a windshield cleaner, a stirrup member including a pair of opposed ears, one of said ears having a bearing, and a member for engaging a wiper shaft and disposed between said ears, the member for engaging the shaft having a trunnion for engagement in said bearing, one of said ears being resilient whereby upon flexure thereof the trunnion may be engaged in the bearing.

10. In a wiper mounting for windshield cleaners, a wiper shaft having a seat, a wiper arm, a saddle engaging the seat and pivoted to the wiper arm, and resilient means acting between a portion of the shaft spaced from the saddle and arm for urging angular movement of the latter about the pivot axis.

11. In a wiper mounting for windshield cleaners, a wiper shaft having a seat and a bearing, a rod member having a pintle engaged in the bearing, a stirrup member engaging a portion of the rod member remote from the pintle, a saddle pivoted to said stirrup member and engaging the seat, and a wiper carried by one of said members.

12. In a windshield cleaner, a wiper shaft, a member engaging the shaft and having a trunnion portion on each side of the shaft, said trunnion portions being aligned substantially diametrically of the shaft, and a stirrup having side walls provided with bearings receiving said trunnion portions, and a wiper carrying arm depending from said stirrup.

13. In a windshield cleaner, a wiper shaft, a member engaging the shaft and having a trunnion portion on each side of the shaft, said trunnion portions being aligned substantially diametrically of the shaft, a hollow stirrup having side walls provided with bearings receiving said trunnion portions, and a rod pivoted to said shaft within said stirrup and extending substantially radially from said shaft through an opening in said stirrup.

HENRY HUEBER.
ERWIN C. HORTON.